C. L. FEWELL.
Bed-Bug Exterminators.
No. 139,562.                          Patented June 3, 1873.
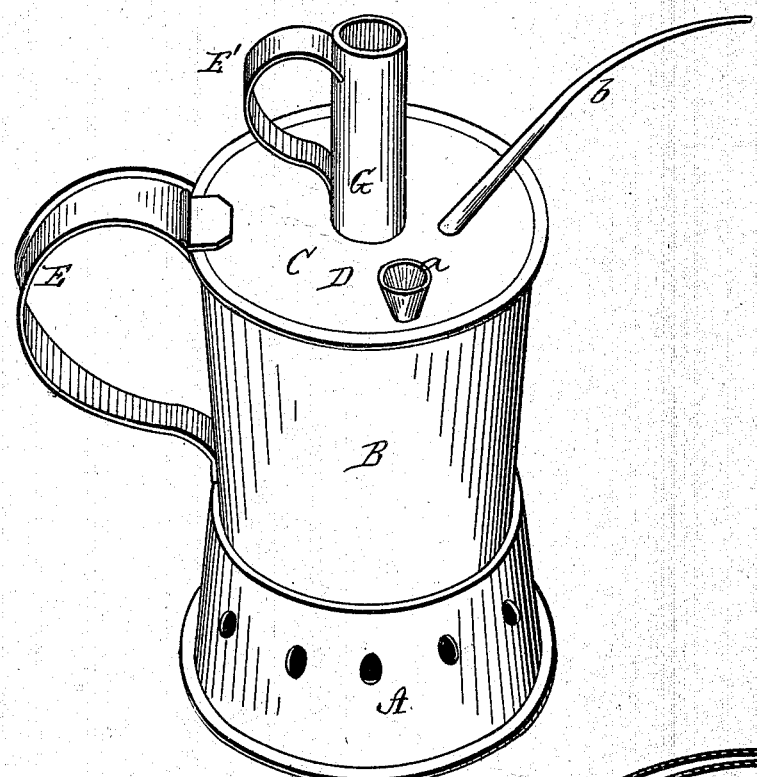
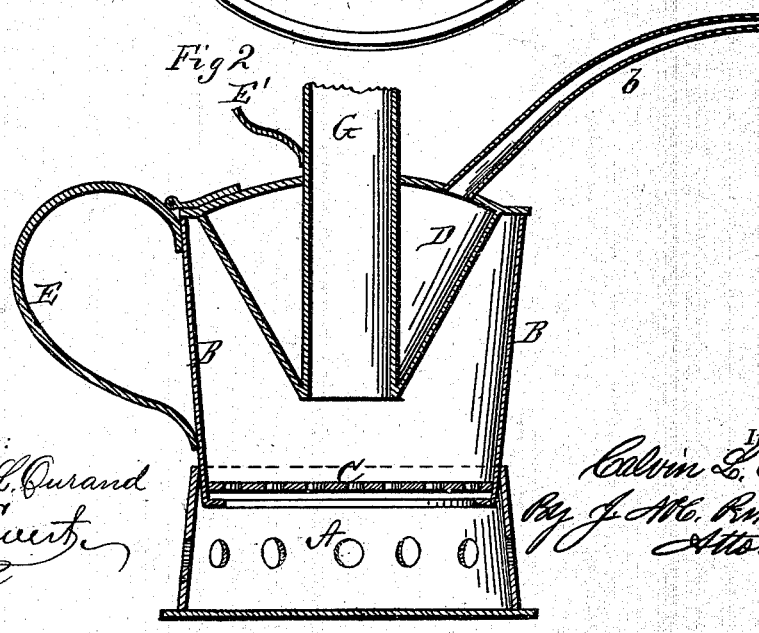

UNITED STATES PATENT OFFICE.

CALVIN L. FEWELL, OF CORSICANA, TEXAS.

IMPROVEMENT IN BED-BUG EXTERMINATORS.

Specification forming part of Letters Patent No. 139,562, dated June 3, 1873; application filed May 5, 1873.

*To all whom it may concern:*

Be it known that I, CALVIN L. FEWELL, of Corsicana, in the county of Navarro and State of Texas, have invented certain new and useful Improvements in Bed-Bug Exterminators; and do hereby declare the following to be a full, clear, and exact description thereof, reference being had to the accompanying drawing and to the letters of reference marked thereon.

The nature of my invention consists in the construction and arrangement of a machine for exterminating bed-bugs by steam, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view, and Fig. 2 a vertical section, of my bed-bug exterminator.

A represents the base of my device forming the ash-box, which is perforated, as shown, so as to allow the ashes which fall into it to cool and at the same time supply the fire in the fire-bucket above with the necessary air. Immediately above the ash-pan is the fire-bucket B, having its bottom C perforated so as to form a complete grate, $c$, on which the fire rests. The fire-bucket B is provided with a handle, E, by which the exterminator is held. D represents the water and steam pot, made in the shape of a truncated cone inverted, its top being slightly oval, and its lower end fitting closely around the lower end of fire-chimney G. This chimney is tubular, extending through the center of the pot D from the bottom to the top, and above the latter a suitable distance.

The water and steam pot D fits into the fire-bucket B and is hinged to the same at the upper end of the handle E. The water is introduced into the pot D through a funnel, $a$, fastened in the top thereof; and a handle, E', is attached to the chimney G by means of which the pot is readily turned on its hinge off from the fire-bucket B, so as to increase or diminish the fire, as desired. $b$ represents the spout through which the steam passes, and which spout is introduced through the top of the pot D. This spout is bent, as shown, and made tapering so that its outer or discharge opening is very small.

The several parts above described, of which the bed-bug exterminator is composed, may be made of sheet iron, tin, or any other suitable material, and of any desired dimensions.

The manner of using the exterminator is by moving the spout along crevices in furniture or walls, as the case may be, when the jet of steam issuing from the spout penetrates to the lurking places of the vermin and carries with it instant destruction.

Having thus fully described my invention, what I claim as new, and desire to secure by Letters Patent, is—

The combination of the ash-pan A, fire-pot B with grate C, hinged water and steam pot D, chimney G, handles E, and spout $b$, all constructed and arranged substantially as and for the purposes herein set forth.

In testimony that I claim the foregoing, I have hereunto set my hand this 23d day of April, 1873.

C. L. FEWELL.

In presence of—
 H. V. HURLOCK,
 SAM. R. FROST.